Patented Feb. 18, 1947

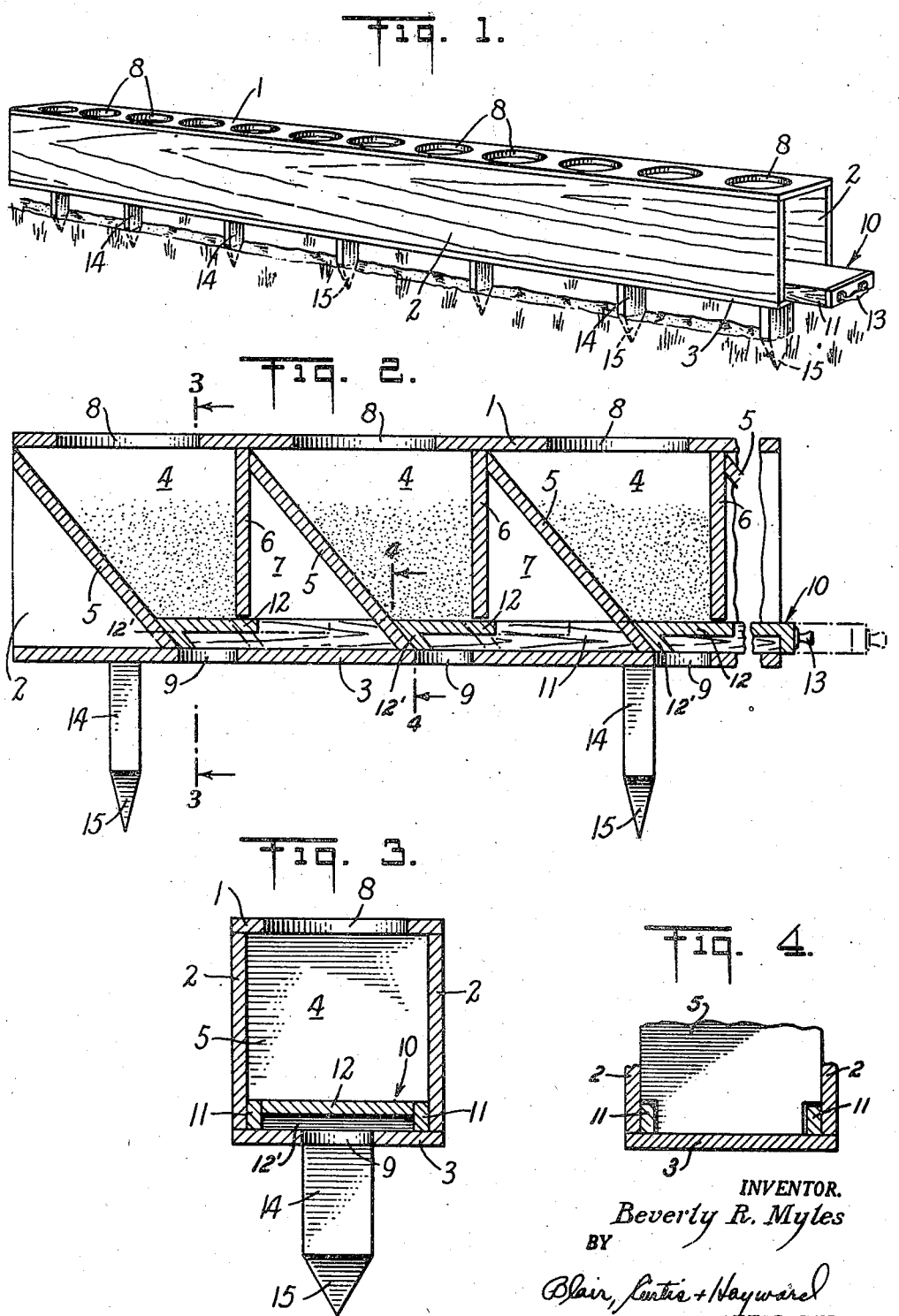

2,415,900

UNITED STATES PATENT OFFICE 2,415,900

FURROWING AND PLANTER DEVICE

Beverly R. Myles, New York, N. Y.

Application January 21, 1944, Serial No. 519,149

1 Claim. (Cl. 222—485)

This invention relates to a combined furrowing and planter device.

An object of the invention resides in the provision of such a device which may be operated to produce furrows of varying depth for the reception of seeds and which is so constructed that after the furrows have been created the device may be used to plant seeds within a furrow at definitely and regularly spaced positions and in varying quantities.

A further object of the invention resides in the production of a combination of elements wherein the furrowing element will act to maintain the device in proper position in relation to a created furrow so that the seeds will be deposited properly within the furrow.

A still further object of the invention resides in so constructing the device that it will be cheap to manufacture and will be easy to operate and efficient in its operation of creating the furrows and planting the seeds.

With these and other objects in view, which will become apparent as the description progresses and which need not here be pointed out in detail, the invention consists of the combination and arrangement of parts described in the specification, illustrated in the drawing and set forth in the claim.

The drawing illustrates one form of the invention wherein:

Figure 1 is a perspective view of the complete device showing the same in position after a furrow has been created;

Figure 2 is a longitudinal vertical section of the same with parts broken away and with the valve mechanism shown in both full and construction lines;

Figure 3 is a transverse vertical section on line 3—3 of Figure 2; and

Figure 4 is a section on line 4—4 of Figure 2.

In manual gardening, especially amateur gardening, the practice of creating a furrow by drawing a stick, rake, hoeing spade or like implement, along a row to create a furrow usually results in a furrow of varying depth, the result of which is that when seeds are planted in the furrow they are lodged at varying depths below the surface of the ground after the furrow is filled in. This, of course, is a considerable disadvantage in that the plants sprout at different times. Moreover, the planting of seeds by hand in a furrow in spaced relation usually results in the uneven spacing of the seeds with the undesirable result of having the plants unequally spaced apart.

The present invention overcomes these difficulties and disadvantages and also simplifies the furrowing and planting operation because the device makes it possible to create a furrow of substantially equal depth from end to end, if such a furrow is desired. Moreover the device makes it possible to plant the seeds at equal distances apart and to simultaneously deposit groups of seeds thus equally spaced apart.

The embodiment of the invention illustrated in the drawing includes a substantially rectangular body portion which includes a top 1, side walls 2 and a bottom 3. The ends of this body portion may be open as illustrated.

Hoppers 4, which are in spaced relation to each other, are arranged within the body. These hoppers are produced by inclined walls 5 which extend from side wall to side wall and from top to bottom of the body by opposite walls 6 which are illustrated as, but need not be, vertical.

The wall 6 of one hopper, in cooperation with the wall 5 of the next adjacent hopper, produces a space or chamber 7 between the hoppers.

The top 1 of the body is provided with a series of openings 8, each leading into a hopper so that seeds may be deposited in the hopper. Seed discharge openings 9 in the bottom of the body are arranged beneath the hoppers 4, one beneath each hopper so that the seeds may be discharged from the hopper through the discharge openings at 9 into the furrow.

A valve mechanism, which is indicated generally by the reference numeral 10, is slidably mounted within the body portion of the device to control the passage of the seeds from the hoppers 4 through the discharge openings 9. This valve mechanism includes spaced side rails 11 which extend through complemental openings in all of the hopper walls 5 except the endmost wall which is illustrated at the left end of Figure 2. These spaced side rails 11 extend substantially throughout the length of the device.

Valve plates 12 are attached to, and extend between, the side rails 11 and each valve plate is adapted to close the lower end of one of the hoppers 4, as illustrated in Figure 2 of the drawing in full lines. These valve plates are provided with cross heads 12'. The movement of these valve plates 12 to open position is limited by their contact with one face of each of the walls 5 and the movement of these valve plates to closed position is limited by the contact of the cross heads with the opposite faces of the walls 5.

The lower end of each wall 6 of each of the hoppers is provided with an opening through which the rails 11 and the valve plates 12 extend and are adapted to ride, which openings, when the valve plates are withdrawn to open the lower ends of the hoppers, are closed by the cross heads 12', as indicated in dot-and-dash lines in Figure 2 of the drawing so that the passage of the seeds from the hoppers will be directed to the discharge openings 9 and will be excluded from the spaces 7 between the hoppers.

The valve is provided with an operating handle 13 by means of which it may be moved in both directions to close or open the discharge ends of the hoppers, the opening and closing movements of the valve being limited as above stated.

Furrowing teeth 14, which are provided with lower pointed sections 15, extend downwardly from the bottom 3 of the body and are arranged in spaced relation to each other.

In using this combined furrowing and planter device the user, either before or after placing the seeds in the hopper and while the valve 10 is closed, may draw the device along a row to form a furrow, the depth of the furrow depending upon the downward pressure that the user exerts upon the device. If the user grasps the device with both ends the furrowing teeth may be drawn along the row with the device under substantially equal pressure from end to end and a substantially even depth furrow produced.

Following the production of the furrow, the user may then place the device in the furrow or permit it to remain in the position that it occupies after the creation of the furrow and it will be maintained in position for seed planting by the furrowing teeth 14.

The user may then, by grasping the handle 13, pull the valve 12 outwardly to the dot and dash lines shown in Figure 2, at which time a quantity of seeds will flow from each of the hoppers into and through the discharge openings 9 and be deposited in the furrow, since the discharge openings are in alignment with the furrowing teeth 14. If only a sufficient quantity of seeds for one planting is placed in each of the hoppers they may be completely discharged therefrom. If, however, the user desires to place several plantings of seeds in each of the hoppers, he may, after a sufficient quantity has been deposited in one series of emplacements, push the valve inwardly to cut off the flow of seeds.

Moreover, the valve plates 12 need not be completely withdrawn from beneath the hoppers. They may be partly withdrawn, which will permit a variation of the amount of seed flow from the hoppers to the furrow.

With a furrowing and planter device of this type the rows may be furrowed and the seeds planted in such manner that each separate seed hill will have substantially the same number of seeds as each of the others which are simultaneously planted, and the seed deposits will be of substantially even depth below the surface of the ground so that the plants should appear substantially at the same time.

While I have illustrated and described a particular embodiment of my invention, I do not wish to be limited to that construction except in so far as it is necessitated by the breadth of the claim.

What I claim is:

In a planting device, a pair of spaced side walls, a bottom wall having a plurality of discharge openings therethrough, inclined and substantially vertical walls extending between said side walls and forming seed hoppers above said openings and forming spaces between said hoppers, said substantially vertical walls terminating short of the bottom of said device to form a space between the lower ends of said walls and said bottom, said inclined walls having openings therethrough adjacent the side walls of said device, and a valve assembly slidably mounted on the bottom wall of said device and including side rails passing below the lower ends of said substantially vertical walls and through said openings in said inclined walls, and valve plates extending between and mounted on said side rails and including cross heads, said valve plates being adapted to close the lower ends of said hoppers and to be withdrawn into the spaces between said hoppers to open said lower ends of said hoppers with said cross heads disposed between the lower ends of said substantially vertical walls and the bottom of said device to close the spaces between said walls and said bottom.

BEVERLY R. MYLES.

REFERENCES CITED

The following references are of record in the file of this patent:

UNITED STATES PATENTS

| Number | Name | Date |
| --- | --- | --- |
| 854,377 | McQueen | May 21, 1907 |
| 456,412 | Heath et al. | July 21, 1891 |
| 20,193 | Clay | May 11, 1858 |
| 163,711 | Whitman | May 25, 1875 |
| 1,305,273 | Fritz | June 3, 1919 |
| 265,804 | Herberg et al. | Oct. 10, 1882 |

FOREIGN PATENTS

| Number | Country | Date |
| --- | --- | --- |
| 324,477 | Italian | Feb. 4, 1935 |